US008655958B2

(12) United States Patent
Callanan et al.

(10) Patent No.: US 8,655,958 B2
(45) Date of Patent: Feb. 18, 2014

(54) SYSTEM AND METHOD TO PRIORITIZE CHAT ALERTS BASED ON AN ORGANIZATIONAL HIERARCHICAL CHAIN

(75) Inventors: Sean Callanan, Churchtown (IE); Al Chakra, Apex, NC (US); Sonya Purcell, Tipperary (IE); Hugh Smyth, Clontarf (IE)

(73) Assignee: International Business Machines Corporation, Armonk, NY (US)

( * ) Notice: Subject to any disclaimer, the term of this patent is extended or adjusted under 35 U.S.C. 154(b) by 1250 days.

(21) Appl. No.: 11/832,429

(22) Filed: Aug. 1, 2007

(65) Prior Publication Data

US 2009/0037538 A1    Feb. 5, 2009

(51) Int. Cl.
*G06F 15/16*        (2006.01)

(52) U.S. Cl.
USPC .......................................... 709/206; 709/204

(58) Field of Classification Search
USPC .......................................................... 709/206
See application file for complete search history.

(56) References Cited

U.S. PATENT DOCUMENTS

| 6,473,787 | B2 * | 10/2002 | Miloslavsky | 709/206 |
|---|---|---|---|---|
| 6,775,690 | B1 * | 8/2004 | Creswell et al. | 709/206 |
| 7,142,664 | B2 * | 11/2006 | Seligmann | 379/373.01 |
| 7,409,428 | B1 * | 8/2008 | Brabec et al. | 709/206 |
| 7,739,345 | B2 * | 6/2010 | Heinzel et al. | 709/207 |
| 2004/0066932 | A1 * | 4/2004 | Seligmann | 379/373.01 |
| 2004/0243941 | A1 * | 12/2004 | Fish | 715/752 |
| 2004/0254998 | A1 * | 12/2004 | Horvitz | 709/206 |
| 2005/0038863 | A1 * | 2/2005 | Onyon et al. | 709/207 |
| 2005/0149622 | A1 * | 7/2005 | Kirkland et al. | 709/207 |
| 2005/0204001 | A1 * | 9/2005 | Stein et al. | 709/206 |
| 2006/0036688 | A1 * | 2/2006 | McMahan et al. | 709/206 |
| 2006/0069729 | A1 * | 3/2006 | Chen | 709/206 |
| 2006/0259565 | A1 * | 11/2006 | Cheung et al. | 709/206 |
| 2007/0019797 | A1 * | 1/2007 | Morris | 379/202.01 |
| 2007/0203993 | A1 * | 8/2007 | Cai et al. | 709/206 |
| 2008/0005249 | A1 * | 1/2008 | Hart | 709/206 |

* cited by examiner

*Primary Examiner* — Linglan Edwards
(74) *Attorney, Agent, or Firm* — Jeffrey T. Holman

(57) ABSTRACT

In a chat alert method and system, a chat user creates alert profiles that include the requestor's level in an organizational hierarchy as a parameter and the alert type for the level. When a chat client receives a chat request from a requester for a receiver, the chat client determines if there is a chat alert profile that matches the requestor's level. If so, then an alert is issued to the receiver according to the matching chat alert profile. Optionally, the chat alert profile sets an alternate alert system, where if the receiver does not respond to the request within a specified time, an alert is sent using the alternate alert system. Chat requests from requesters higher up in the reporting chain can be highlighted for the receiver. The receiver can then prioritize the chat requests that he/she receives and respond to them in a timely fashion.

20 Claims, 3 Drawing Sheets

SYSTEM AND METHOD TO PRIORITIZE CHAT ALERTS BASED ON AN ORGANIZATIONAL HIERARCHICAL CHAIN

BACKGROUND OF THE INVENTION

Online chats are a popular medium through which many users communicate. One chat medium is Instant Messaging (IM). The current art of IM provides a chat window to communicate with other IM users. During the course of a day, IM users initiate and respond to numerous chat requests. Oftentimes, it is not possible for an IM user to respond to all the chat windows in a timely fashion. This scenario can be caused when an IM user receives excessive chat requests, the IM user is at his/her desk but on the phone talking to another work colleague, or the IM user is not physically at the desk where his/her PC or laptop is located. IM clients allow users to set alert preferences for a variety of events. For example, the IM user can be alerted by a sound when he/she receives a chat request or whenever someone on the contact list comes online.

When responding to numerous chat requests, it may not be immediately obvious to the receiver of the request who is requesting the chat, without physically opening that particular chat window. Current IM clients do not provide a method to prioritize chat requests to assist the IM user in deciding who to respond to first. An IM user will typically respond sequentially to chat requests, even though the IM user may or may not know if the requester is a member of the receiving IM user's contact list or the requestor's position in the organization's hierarchy.

For example, if the requestor is the IM users' manager, or someone higher up in the reporting chain, the requester expects an instant, or at least a timely, response to the request. Simultaneously, the IM user has numerous other requests to respond to. However, the IM user is not aware that a request from his manager is among the numerous requests, and the IM user does not respond immediately. If the IM user is aware of the request, then he/she could timely respond to the manager's chat request.

BRIEF SUMMARY OF THE INVENTION

A method and system for providing online chat alerts include: receiving by a chat client a chat request from a requester for a receiver; obtaining by the chat client a requestor's level in an organizational hierarchy; determining by the chat client if any chat alert profile matches the requestor's level; and issuing by the chat client an alert to the receiver according to the matching chat alert profile, if a chat alert profile matches the requestor's level.

The chat client obtains the requestor's level from a directory server, using a Lightweight Directory Access Protocol (LDAP).

The matching chat alert profile includes a plurality of parameters, the parameters including the requestor's level relative to a receiver's level in a reporting chain and an alert type. The alert type includes a sound or a chat window color. The chat client issues the alert to the receiver according to the alert type.

The chat client further determines if an alternate alert system is set in the matching chat alert profile; determines client if the receiver has responded to the chat request in a time specified in the matching chat alert profile, if the alternate alert system is set in the matching chat alert profile; and sends a second alert to the receiver using the alternate alert system according to the matching chat alert profile, if the receiver has not responded to the chat request in the time specified in the matching chat alert profile.

The alternate alert system includes at least one of text messaging; email; pager; network message; and Radio Frequency Identification (RFID). The alternate alert system is added to functionalities of the chat client using a plugin.

In one embodiment, the chat client receives an alert according to an alternate alert system selected by the requester.

DETAILED DESCRIPTION OF THE INVENTION

The present invention provides a method and system for providing chat alerts based on a requestor's place in an organizational hierarchy. The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system allows a chat user to create chat alert profiles that includes the requestor's level in an organizational hierarchy as a parameter. The chat alert profiles would set the alert type for the level, such as sound or chat window color. Optionally, the chat alert profile can set an alternate alert system, where an alert is sent to the receiver using the alternate alert system if the receiver does not respond to the request within a time specified in the chat alert profile.

The following exemplary embodiments are applicable to any number of chat mechanisms, including but not limited to Instant Messaging (IM), forums, discussion databases, and phone chat rooms, without departing from the spirit and scope of the invention.

Figure 1:
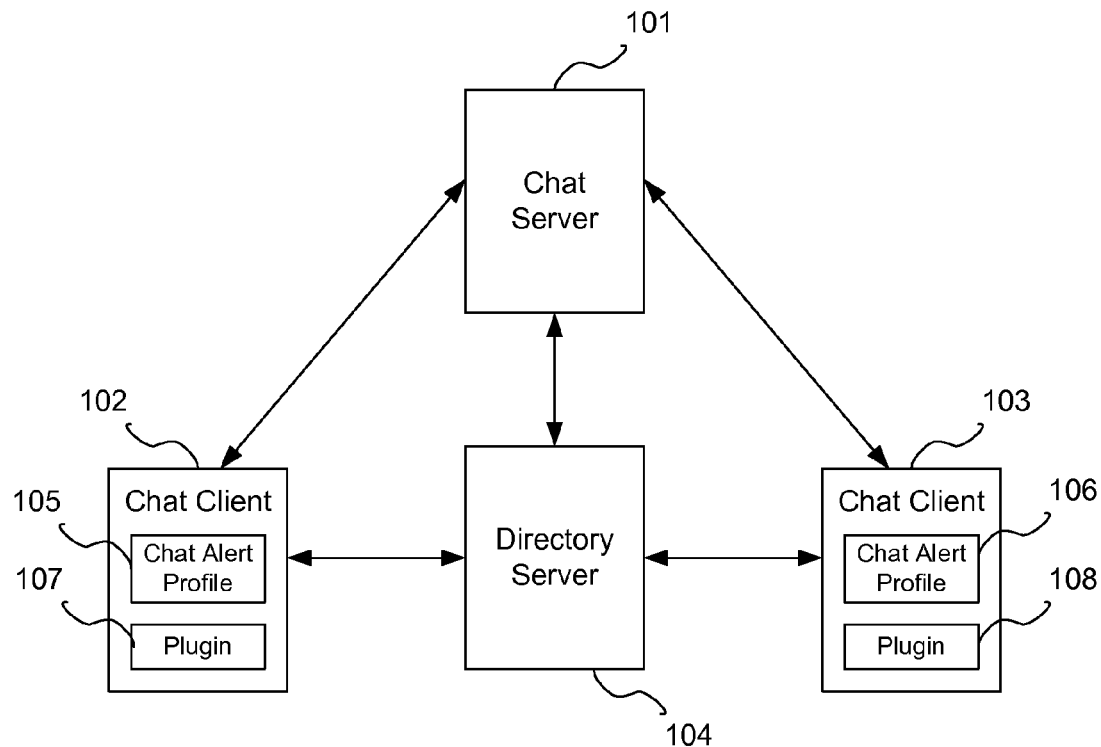
FIG. 1 illustrates an exemplary embodiment of a system for providing chat alerts based on a requestor's place in an organizational hierarchy.

FIG. 1 illustrates an exemplary embodiment of a system for providing chat alerts based on a requestor's place in an organizational hierarchy. The system includes a chat server 101 for providing the chat service to chat clients 102-103. Users at the chat clients 102-103 can create one or more chat alert profiles 105-106 that include a chat requestor's level in the organization hierarchy as a parameter. The chat server 101 and chat clients 102-103 connect to an organization's directory stored at a directory server 104. The directory holds records for the personnel in an organization. The records include information such as name, chat screen name, phone number, job title, authentication information, etc. In the exemplary embodiment, the chat clients 102-103 access the records via Lightweight Directory Access Protocol (LDAP). LDAP is an application protocol for querying and modifying directory services running over TCP/IP. LDAP is known in the art and will not be described in detail here.

When a chat user logs into a chat client 102, the chat server 101 authenticates that user. The chat user's credentials (for example, username and password) are authenticated against his/her record in the directory on the directory server 104. After the chat server 101 validates the credentials, the chat user can access the chat service.

In the exemplary embodiment, an organizational tree is programmatically abstracted from the directory at the directory server 104, with the top of the tree representing persons higher up in a reporting chain. For example, the top of the tree can represent the CEO, under which the entire organization is stored. For another example, the top of the tree can be the department heads with the members of the departments stored under each department head. Other levels can be configured to be the top of tree.

Figure 2:
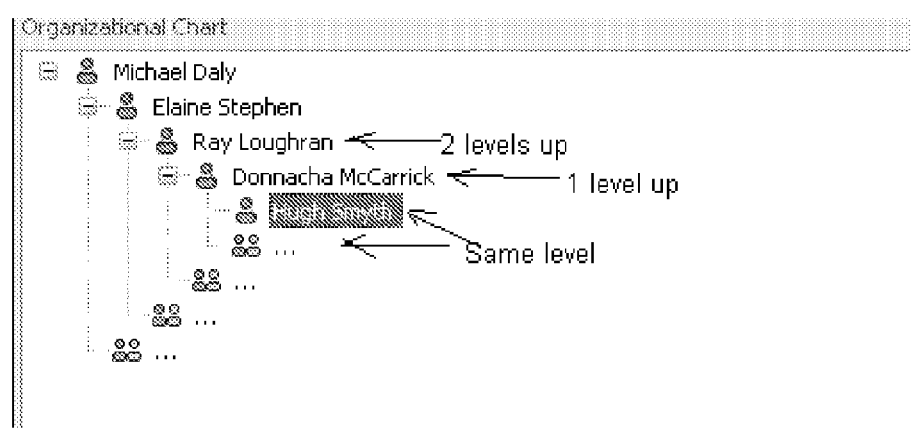
FIG. 2 illustrates an exemplary graphical representation of an organizational hierarchy based on directory records.

FIG. 2 illustrates an exemplary graphical representation of an organizational hierarchy based on directory records. Here, manager "Michael Daly" is configured as the top of an organizational directory tree. For employee "Hugh Smyth", employee "Donnacha McCarrick" is one level up in the hierarchy, and employee "Ray Loughran" is two levels up in the hierarchy. A chat user at any of these levels can create chat alert profiles based on the relative level of the requester in the organization's directory tree.

Figure 3:
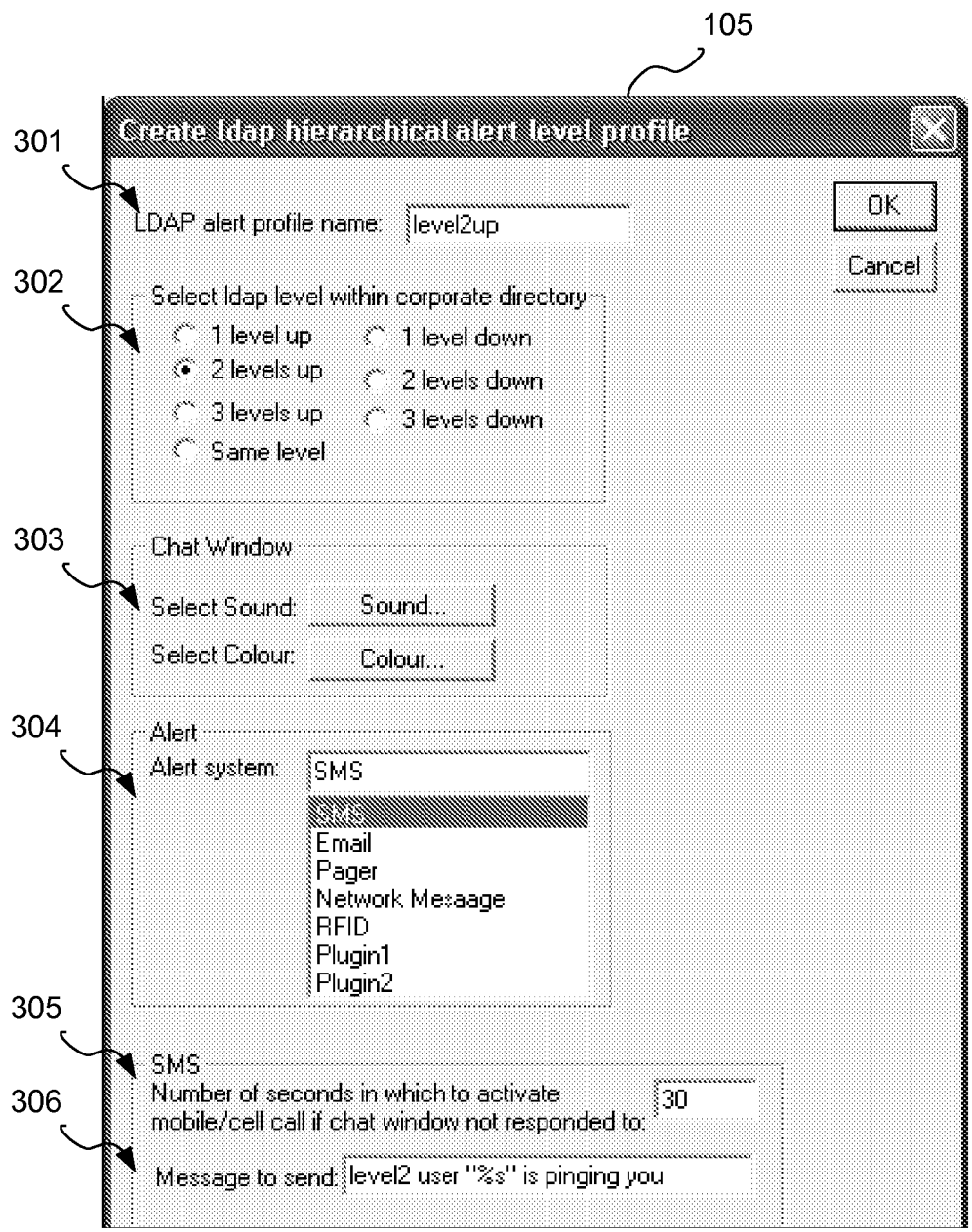
FIG. 3 illustrates an exemplary chat alert profile.

FIG. 3 illustrates an exemplary chat alert profile. A chat user can set a plurality of parameters as part of the profile 105, including: name 301 for the chat level profile; the level 302 within the organizational directory to which the profile 105 is to be applied; and the alert type 303, such as a sound to be played when the chat window is displayed and/or a color for the chat window.

Optionally, the chat user can set an alternate alert system 304. In the exemplary embodiment, alternative alert systems can be added to the chat client functionalities using plugins 107-108 (FIG. 1). An alert system allows a chat receiver to be alerted for a variety of events. For example, one can be alerted by a sound when one receives an invitation or whenever someone on one's contact list comes online. A plugin is a software module that "plugs in" to an application (e.g. chat clients 102-103) in order to give it specific additional functionality. The plugin module is added to the list of modules available to be used by the application. In this specification, the specific alert system plugin module is added to the available alert systems in FIG. 3. Alternative alert systems include Short Messaging Service (SMS) or text messaging, email, pager devices, network message, Radio Frequency Identification (RFID), plugin1, plugin2, etc. The plugin variable data/parameters can be set as part of the chat alert profile 105. The parameters can include a time 305 for sending an alert by the alternate alert system and the message 306 to send. For example, the chat alert profile 105 illustrated in FIG. 3 is set to send an SMS message, "level2 user "% s" is pinging you", if the chat window from a requester two levels up from the receiver is not responded to within 30 seconds. The phone number for the SMS message can be obtained from the receiver's directory record. This allows the receiver to be alerted when the receiver is offline or otherwise indisposed.

A different chat alert profile could be created for each level within the organizational directory. Each profile can be turned off or on by the chat user.

Figure 4:
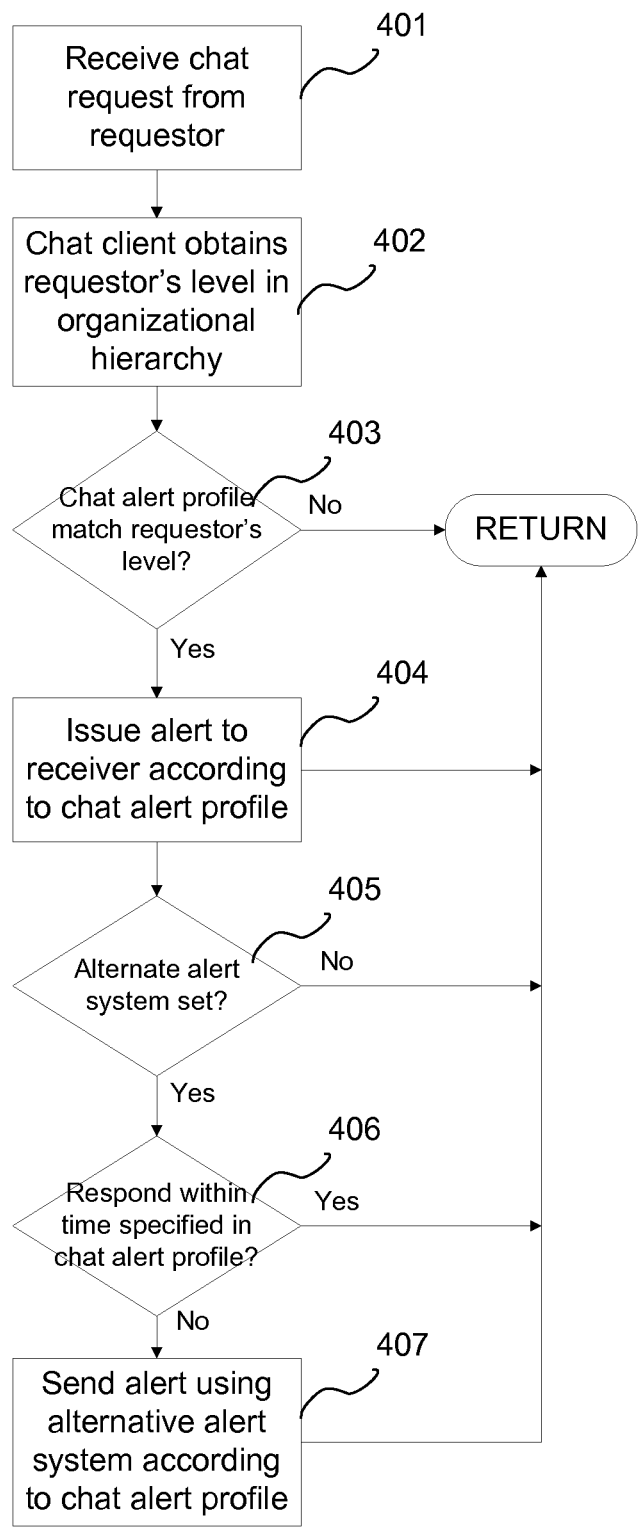
FIG. 4 is a flowchart illustrating an exemplary method for providing chat alerts based on a requestor's level in an organizational hierarchy.

FIG. 4 is a flowchart illustrating an exemplary method for providing chat alerts based on a requestor's level in an organizational hierarchy. First, a chat client 102 receives a chart request from a requester at another chat client 103 (step 401). The chat client 102 obtains the requestor's level in the organizational hierarchy from the directory server 104 (step 402). In the exemplary embodiment, the chat client 102 can obtain this information directly from the directory server 104 or indirectly through the chat server 101. The chat client 102 determines if there is a chat alert profile 105 that matches the requestor's level (step 403). If so, the chat client 102 issues an alert to the receiver according to the chat alert profile 105 (step 404).

If an alternative alert system is set in the chat alert profile 105 (step 405), and the receiver has not responded with the time specified in the profile 105 (step 406), then a second alert is sent using the alternate alert system according to the chat alert profile 105 (step 407).

Through the use of chat alert profiles for different levels of an organizational hierarchy, chat requests from requesters higher up in the reporting chain can be highlighted for the receiver. The receiver can then prioritize the chat requests that he/she receives and respond to them in a timely fashion.

Optionally, an alert profile can be turned off for specific requesters by the chat user. So when the chat user receives a chat request from a particular requester, the chat user can choose not to receive alerts according to the chat profile that matches the requestor's hierarchical level.

In another exemplary embodiment, the requester can select an alternate alert system. For example, if the receiver is in an "I am away" state, "do not disturb" state, or has not responded to a request after a specified amount of time, the requestor's chat client 103 sends an SMS message to the receiver's cellular phone, based on a chat alert profile 106 at the requesting chat client 103. In this manner, the receiver is alerted to the request, although indisposed at the present time. When the receiver comes back on line, the receiver can then initiate a chat with the requester based on priority dictates or on the requestor's level within the organizational hierarchy.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD.

A method and system for providing chat alerts based on a requestor's place in an organizational hierarchy have been disclosed. A chat user creates alert profiles that include the requestor's level in an organizational hierarchy as a parameter. The alert profiles would set the alert type for the level, such as sound or chat window color. When a chat client receives a chat request from a requester for a receiver, the chat client obtains the requestor's level in the organizational hierarchy and determines if any chat alert profile matches the requestor's level. If so, then the chat client issues an alert to the receiver according to the matching chat alert profile.

Optionally, the alert profile can set an alternate alert system if the receiver does not respond to a request within a time specified in the alert profile. Through the use of chat alert profiles for different levels of an organizational hierarchy, chat requests from requesters higher up in the reporting chain can be highlighted for the receiver. The receiver can then prioritize the chat requests that he/she receives and respond to them in a timely fashion.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system, comprising:
   a processor;
   a memory;
   an organizational hierarchy; and
   a chat client comprising a group of at least one chat alert profile, wherein each chat alert profile specifies an alert action to be implemented in conjunction with delivery of a chat request and wherein each chat alert profile specifies a corresponding hierarchical level of the organizational hierarchy relative to a receiver, wherein the group of at least one chat alert profile comprises a separate chat alert profile for each level in the organizational hierarchy relative to the receiver, wherein the chat client receives the chat request from a requester for the receiver, obtains a requestor's level in the organizational hierarchy relative to the receiver, determines if the hierarchical level relative to the receiver specified in any chat alert profile matches the requestor's level relative to the receiver, and issues an alert to the receiver according to the alert action specified in the matching chat alert profile in response to a determination that the hierarchical level relative to the receiver specified in the chat alert profile matches the requestor's level relative to the receiver.

2. The system of claim 1, further comprising a directory server, wherein the chat client obtains the requestor's level relative to the receiver from the directory server.

3. The system of claim 2, wherein the requestor's level relative to the receiver is obtained from the directory server using a Lightweight Directory Access Protocol (LDAP).

4. The system of claim 1, wherein the matching chat alert profile comprises a plurality of parameters, wherein the plurality of parameters comprises:
   the requestor's level relative to a receiver's level in a reporting chain; and
   an alert type.

5. The system of claim 4, wherein the alert type comprises a sound or a chat window color.

6. The system of claim 4, wherein the plurality of parameters further specifies an alternate alert system and a specified time, wherein the chat client sends a second alert to the receiver using the alternate alert system according to the matching chat alert profile if the receiver has not responded to the chat request within the specified time.

7. The system of claim 6, wherein the plurality of parameters specifies the alternate alert system as at least one system of a plurality of systems, wherein the plurality of systems comprises:
   a text messaging system;
   a email system;
   a pager system;
   a network message system; and
   a Radio Frequency Identification (RFID) system.

8. The system of claim 6, wherein the chat client further comprises a plugin for adding the alternate alert system to functionalities of the chat client.

9. The system of claim 1, wherein the chat client further receives an alert according to an alternate alert system selected by the requester.

10. A computer program product comprising a non-transitory computer useable storage medium having a computer readable program, wherein the computer readable program when executed on a computer causes the computer to:
    receive by a chat client a chat request from a requester for a receiver;
    obtain by the chat client a requestor's level in an organizational hierarchy relative to the receiver;
    determine by the chat client if any chat alert profile within a group of chat alert profiles matches the requestor's level relative to the receiver, wherein each chat alert profile specifies an alert action to be implemented in conjunction with delivery of a chat request and wherein each chat alert profile specifies a corresponding hierarchical level of the organizational hierarchy relative to the receiver and wherein the group of chat alert profiles comprises a separate chat alert profile for each level in the organizational hierarchy relative to the receiver; and
    issue by the chat client an alert to the receiver according to the alert action specified in the matching chat alert profile, in response to a determination that the hierarchical level relative to the receiver specified in the chat alert profile matches the requestor's level relative to the receiver.

11. A method for providing online chat alerts, comprising:
    receiving by a chat client a chat request from a requester for a receiver;
    obtaining by the chat client a requestor's level in an organizational hierarchy relative to the receiver;
    determining by the chat client if any chat alert profile within a group of chat alert profiles matches the requestor's level relative to the receiver, wherein each chat alert profile specifies an alert action to be implemented in conjunction with delivery of a chat request and wherein each chat alert profile specifies a corresponding hierarchical level of the organizational hierarchy relative to the receiver and wherein the group of chat alert profiles comprises a separate chat alert profile for each level in the organizational hierarchy relative to the receiver; and
    issuing by the chat client an alert to the receiver according to the alert action specified in the matching chat alert profile, in response to a determination that the hierarchical level relative to the receiver specified in the chat alert profile matches the requestor's level relative to the receiver.

12. The method of claim 11, wherein the obtaining comprises:
    obtaining the requestor's level relative to the receiver from a directory server.

13. The method of claim 12, wherein the requestor's level relative to the receiver is obtained using a Lightweight Directory Access Protocol (LDAP).

14. The method of claim 11, wherein the matching chat alert profile comprises a plurality of parameters, wherein the plurality of parameters comprises:
    the requestor's level relative to a receiver's level in a reporting chain; and
    an alert type.

15. The method of claim 14, wherein the alert type comprises a sound or a chat window color.

16. The method of claim 14, wherein the issuing comprises:
   issuing the alert by the chat client to the receiver according to the alert type.

17. The method of claim 11, further comprising:
   determining by the chat client if an alternate alert system is set in the matching chat alert profile;
   determining by the chat client if the receiver has responded to the chat request in a time specified in the matching chat alert profile, if the alternate alert system is set in the matching chat alert profile; and
   sending a second alert to the receiver using the alternate alert system according to the matching chat alert profile, if the receiver has not responded to the chat request in the time specified in the matching chat alert profile.

18. The method of claim 17, wherein the plurality of parameters specifies the alternate alert system as at least one system of a plurality of systems, wherein the plurality of systems comprises:
   a text messaging system;
   an email system;
   a pager system;
   a network message system; and
   a Radio Frequency Identification (RFID) system.

19. The method of claim 17, wherein the alternate alert system is added to functionalities of the chat client using a plugin.

20. The method of claim 11, further comprising:
   receiving an alert by the chat client according to an alternate alert system selected by the requester.

* * * * *